United States Patent Office  3,502,648
Patented Mar. 24, 1970

3,502,648
7-HALO-7-DEOXYTHIOLINCOSAMINIDES AND PROCESS FOR PREPARING THE SAME
Robert D. Birkenmeyer, Comstock Township, Kalamazoo County, and Fred Kagan, Kalamazoo, Mich., assignors to The Upjohn Company, Kalamazoo, Mich., a corporation of Delaware
No Drawing. Continuation-in-part of applications Ser. No. 431,184, Feb. 8, 1965, Ser. No. 498,989, Oct. 20, 1965, Ser. No. 511,288, Dec. 1, 1965, and Ser. No. 588,305, Oct. 21, 1966. This application Dec. 22, 1967, Ser. No. 692,727
Int. Cl. C07d 7/04
U.S. Cl. 260—210                                     15 Claims

ABSTRACT OF THE DISCLOSURE

Compounds of the formula:

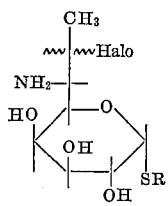

I are prepared by replacing by chlorine, bromine, or iodine, the 7-hydroxy of a compound of the formula:

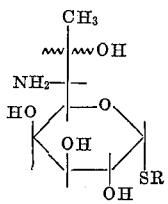

II by means of a Rydon reagent or a modified Rydon reagent. The compounds of Formula I are useful as intermediates, for example, for making 7-halo-7-deoxylincomycin analogs.

The starting compounds of Formula II are prepared by hydrazinolysis of a compound of the formula:

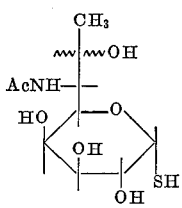

III

CROSS REFERENCES TO RELATED APPLICATIONS

This application is in part a continuation of our copending applications Ser. No. 498,989, filed Oct. 20, 1965, and 588,305, filed Oct. 21, 1966, both now abandoned. It is also in part a continuation of our copending application 511,288 filed Dec. 1, 1965, and the parent application thereof 431,184 filed Feb. 8, 1965, both now abandoned.

BRIEF SUMMARY OF INVENTION

This invention relates to novel compounds and to processes for preparing them, and is particularly directed to 7-halo-7-deoxythiolincosaminides and to processes whereby they and like compounds are produced.

The novel compounds of the invention can be represented by the following structural formula:

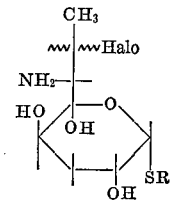

wherein halo is chlorine, bromine, or iodine and R is alkyl of not more than 20 carbon atoms, advantageously not more than 8 carbon atoms, cycloalkyl of from 3 to not more than 8 carbon atoms, and aralkyl of not more than 12 carbon atoms, advantageously not more than 8 carbon atoms.

Examples of alkyl of not more than 20 carbon atoms are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereof. Examples of cycloalkyl are cyclopropyl, cyclobutyl, cyclopentyl, cyclohexyl, cycloheptyl, cyclooctyl, 2-methylcyclopentyl, 2,3-dimethylcyclobutyl, 4-methylcyclobutyl, and 3-cyclopentylpropyl. Examples of aralkyl are benzyl, phenethyl, α-phenylpropyl, and α-naphthylmethyl.

The novel compounds of the invention, Formula I, as well as other related compounds, can be prepared by replacing by chlorine, bromine, or iodine, the 7-hydroxy of a compound of the formula:

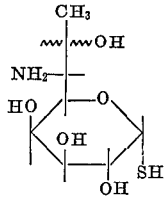

II

The replacement with chlorine or bromine is effected advantageously by mixing the starting compound of Formula II with a Rydon reagent and heating. The replacement with iodine is advantageously effected by mixing the starting material with triphenylphosphine and carbon tetraiodide in an inert solvent. The replacement with chlorine and bromine can also be effected by mixing the starting material with triphenylphosphine and carbon tetrachloride or carbon tetrabromide. In the processes R can be the radical of any mercaptan but for preparing compounds of the invention, R is as given above. Any or all of the 2-, 3-, and 4-hydroxy groups can be esterified or etherified either before or after the halogenation by first protecting the nitrogen.

DETAILED DESCRIPTION

The starting compounds of Formula II are prepared by hydrazinolysis of a compound of the formula:

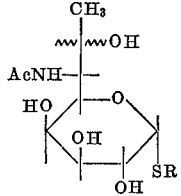

III wherein any or all of the 2-, 3-, and 4-hydroxy groups are esterified or etherified, R is as given above, and Ac is an acyl radical, advantageously, the acyl radical of a 4-substituted-L-2-pyrrolidinecarboxylic acid of the formula:

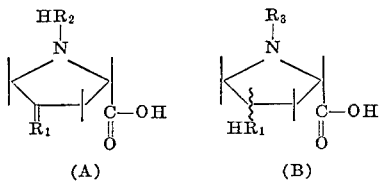

wherein $R_1$ and $R_2$ are alkylidene of not more than 20 carbon atoms (including methylene), advantageously of not more than 8 carbon atoms, cycloalkylidene of from 3 to not more than 8 carbon atoms, and aralkylidene of not more than 12 carbon atoms, advantageously not more than 8 carbon atoms, and $R_3$ is hydrogen or $HR_2$. The hydrazinolysis can be effected as described in U.S. Patent 3,179,565.

The compounds of Formula I are also useful as intermediates for producing 7-halo-7-deoxylincomycin and isomers and analogs thereof. Such compounds are prepared by acylating a compound of Formula I with a 4-substituted-L-2-pyrrolidinecarboxylic acid of Formula A or B. This acylation can be effected by procedures already well-known in the art of acylating amino sugars. The starting acids trans-4-ethyl and 4-propyl-L-2-pyrrolidinecarboxylic acid can be obtained by hydrolysis of N-demethyllincomycin B and lincomycin D, respectively; and the N-methyl analogs from lincomycin B and lincomycin, respectively.

Some of the starting compounds of Formula III are obtained biosynthetically. Lincomycin, methyl 6,8-dideoxy-6 - (trans - 1-methyl-4-propyl-L-2-pyrrolidinecarboxamido) - 1-thio-D-erythro-α-D-galacto-octopyranoside, is obtained as an elaboration product of a lincomycin-producing actinomycete according to U.S. Patent 3,086,912. It has the following structural formula:

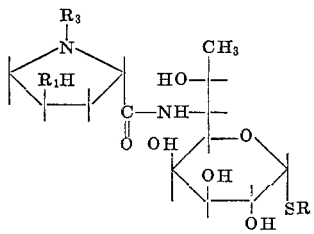

IV wherein R and $R_3$ are methyl and $R_1H$ is propyl. Lincomycin B methyl 6,8-dideoxy-6-(trans-1-methyl-4-ethyl-L - 2 - pyrrolidinecarboxamido) - 1-thio-D-erythro-α-D-galacto-octopyranoside (Formula IV wherein R and $R_3$ are methyl and —$R_1H$ is ethyl) also is an elaboration product of the same microorganism when cultured according to the procedure given in U.S. Patent 3,086,912. Lincomycin C, ethyl 6,8-dideoxy-6-(trans-1-methyl-4-propyl - L - 2-pyrrolidinecarboxamido)-1-thio-D-erythro-α-D-galacto-octopyranoside (Formula IV wherein R is ethyl, —$R_1H$ is propyl, and $R_3$ is methyl) is obtained when the process of U.S. Patent 3,086,912 is carried out in the presence of added ethionine. Lincomycin D, methyl 6,8-dideoxy - 6 - (trans-4-propyl-L-2-pyrrolidinecarboxamido)-1-thio-D-erythro-α-D-galacto-octopyranoside (Formula IV wherein R is methyl, —$R_1H$ is propyl, and $R_3$ is hydrogen) is obtained when the fermentation of U.S. Patent 3,086,912 is carried out in the presence of added α-MTL, methyl 6-amino-6,8-dideoxy-D-erythro-1-thio-α-D galacto-octopyranoside, a compound of Formula III obtained by the hydrazinolysis of lincomycin. Methyl 6,8-dideoxy-6-(trans - 4 - ethyl-L-2-pyrrolidinecarboxamido)-1-thio-D-erythro-α-D-galacto-octopyranoside (Formula IV wherein R is methyl, —$R_1H$ is ethyl and $R_3$ is hydrogen) is also produced when α-MTL is added to the fermentation of U.S. Patent 3,086,912. Similarly, lincomycin K, ethyl 6,8-dideoxy - 6 - (trans-4-propyl-L-2-pyrrolidinecarboxamido) - 1-thio-D-erythro-α-D-galacto-octopyranoside (Formula IV wherein R is ethyl, —$R_1H$ is propyl, and $R_3$ is hydrogen) is produced when the fermentation of U.S. Patent 3,086,912 is carried out in the presence of added α-ETL, ethyl 6 - amino-6,8-dideoxy-D-erythro-α-thio-D-galacto-octopyranoside, a compound of Formula III obtained by the hydrazinolysis of lincomycin C. Ethyl 6,8-dideoxy - 6 - (trans-4-ethyl-L-2-pyrrolidinecarboxamido)-1 - thio-D-erythro-α-D-galacto-octopyranoside (Formula IV wherein R is ethyl, —$R_1H$ is ethyl, and $R_3$ is hydrogen) is also obtained when α-ETL is added to the fermentation of U.S. Patent 3,086,912.

Other starting compounds of Formula III where Ac and R are as given above and having both the D-erythro and L-threo configurations are described in Belgian Patent 667,948, Feb. 2, 1966, and its cognate Spanish Patent 316,092, Oct. 14, 1965 (U.S. application Ser. No. 463,934, filed June 14, 1965, now U.S. Patent 3,380,992).

The mechanism by which triphenylphosphinedihalide effects the substitution of the 7-hydroxy by halogen is not fully understood. The mechanism is such, however, that a change in configuration results. Thus, 7-hydroxy compound of the D-erythro configuration yields a 7-halo compound of the L-threo configuration.

Triphenylphosphinedichloride is formed by the addition of chlorine to triphenylphosphine. Rydon et al., J. Chem. Soc., 2224 (1953); Ibid, 2281 (1954); Ibid, 3043 (1956). The triphenylphosphinedichloride can be formed in situ by addition of chlorine to a solution of the triphenylphosphine in an inert solvent such as acetonitrile or dimethylformamide, or it can be isolated as a separate entity. In either case the reaction with the starting thiolincosaminide is effected by contacting the triphenylphosphinedichloride therewith in an inert solvent, e.g., acetonitrile or dimethylformamide, until the desired substitution of the 7-hydroxy is obtained. The reaction takes place at ordinary temperature, though gentle heating can be effected if desired. Advantageously the temperature is maintained between about 20° C. and about 55° C. The product can be recovered from the reaction mixture by well-known techniques such as filtration, solvent extraction, etc. The reaction mixture advantageously is treated with methanol to destroy any excess triphenylphosphinedichloride, filtered to remove any solid such as triphenylphosphine oxide, formed in the reaction, and then treated to recover the product. The methanol can be added either before or after the filtration. Advantageously the treated and filtered reaction mixture is evaporated to dryness and purified by solvent extraction and/or chromatography.

Substitution of the 7-hydroxy by iodine is effected by a modification of the Rydon reagent process. In this process, the desired halogen substitution is effected simply by mixing the starting compound of Formula II with triphenylphosphine and carbon tetraiodide in an inert solvent. The reaction takes place at room temperature (25° C.) but gentle heating up to reflux temperature of 50 to 60° C. can be used.

Acetonitrile and nitromethane are illustrative solvents. The triphenylphosphine and carbon tetraiodide are optimally used in equimolar proportions and advantageously in a substantial molar excess of the starting compound. Optimally about 4 moles of triphenylphosphine and 4 moles of carbon tetraiodide are used for each mole of starting compound of Formula II. The process can also be used for effecting chlorination and bromination by substituting carbon tetrachloride or carbon tetrabromide for the carbon tetraiodide.

Any or all of the 2-, 3-, and 4-hydroxy groups can be esterified either before or after the halogenations, for example, with hydrocarbon carboxylic acids, advantageously of not more than 18 carbon atoms, or halo-, nitro-, hydroxy-, amino-, cyano-, thiocyano-, or alkoxy substituted hydrocarbon carboxylic acids, advantageously also of not more than 18 carbon atoms.

Example of carboxylic acid acyl radicals are the acyl radicals of the following acids: (a) saturated or unsaturated, straight or branched chain aliphatic carboxylic acids, for example acetic, propionic, butyric, isobutyric, tert-butylacetic, valeric, isovaleric, caproic, caprylic, decanoic, dodecanoic, lauric, tridecoic, myristic, pentadecanoic, palmitic, margaric, stearic, acrylic, crotonic, undecylenic, oleic, hexynoic, heptynoic, octynoic acids, and the like; (b) saturated or unsaturated, alicyclic carboxylic acids, for example, cyclobutanecarboxylic acid, cyclopentanecarboxylic acid, cyclopentenecarboxylic acid, methylcyclopentenecarboxylic acid, cyclohexanecarboxylic acid, dimethylcyclohexenecarboxylic acid, dipropylcyclohexanecarboxylic acid, and the like; (c) saturated or unsaturated, alicyclic aliphatic carboxylic acids, for example, cyclopentaneacetic acid, cyclopentanepropionic acid, cyclopentaneacetic acid, cyclohexanebutyric acid, methylcyclohexaneacetic acid, and the like; (d) aromatic carboxylic acids, for example, benzoic acid, toluic acid, naphthoic acid, ethylbenzoic acid, isobutylbenzoic acid, methylbutylbenzoic acid, and the like; and (3) aromatic-aliphatic carboxylic acids, for example, phenylacetic acid, phenylpropionic acid, phenylvaleric acid, cinnamic acid, phenylpropiolic acid and naphthylacetic acid, and the like. Suitable halo-, nitro-, hydroxy-, amino-, cyano-, thiocyano-, and lower alkoxyhydrocarbon carboxylic acids include hydrocarbon carboxylic acids as given above which are substituted by one or more of halogen, nitro, hydroxy, amino, cyano, or thiocyano, containing a total of not more than 18 carbon atoms, or alkoxyhydrocarbon carboxylic acids of not more than 18 carbon atoms. Suitable such alkoxy groups include methoxy, ethoxy, propoxy, butoxy, amyloxy, hexyloxy, dodecyloxy, hexadecyloxy, and isomeric forms thereof. Examples of such substituted hydrocarbon carboxylic acids are mono-, di-, and trichloracetic acid; $\alpha$- and $\beta$-chloropropionic acid; $\alpha$- and $\gamma$-bromobutyric acid; $\alpha$-and iodovaleric acid; mevalonic acid; 2- and 4-chlorocyclohexanecarboxylic acid; shikimic acid; 2-nitro-1-methyl-cyclobutene-carboxylic acid; 1,2,3,4,5,6 - hexachlorocyclohexanecarboxylic acid; 3-bromo-2-methylcyclohexanecarboxylic acid; 4-and 5-bromo - 2 - methylcyclohexanecarboxylic acid; 5 - and 6 - bromo-2-methylcyclohexanecarboxylic acid; 2,3-dibromo-2-methyl-cyclohexanecarboxylic acid; 2,5-dibromo-2-methylcyclohexanecarboxylic acid; 4,5-dibromo-2-methylcyclohexanecarboxylic acid; 5,6-dibromo-2-methylcyclohexanecarboxylic acid; 3-bromo-3-methyl-cyclohexanecarboxylic acid; 6-bromo - 3-methylcyclohexanecarboxylic acid; 1,6-di-bromo - 3-methylcyclohexanecarboxylic acid; 2-bromo-4-methylcyclohexanecarboxylic acid; 1,2-dibromo-4-methylcyclohexanecarboxylic acid; 3-bromo - 2,2,3 - trimethylcyclopentanecarboxylic acid; 1-bromo - 3,5-dimethylcyclohexanecarboxylic acid; homogentisic acid, o-, m-, and p-chlorobenzoic acid; anisic acid; salicyclic acid; p-hydroxybenzoic acid; $\beta$-resorcylic acid; gallic acid; veratric acid; trimethoxybenzoic acid; trimethoxycinnamic acid; 4,4'-dichlorobenzilic acid; o-, m-, and p-nitrobenzoic acid; cyanoacetic acid; 3,4- and 3,5-dinitrobenzoic acid; 2,4,6-trinitrobenzoic acid; thiocyanoacetic acid; cyanopropionic acid; and lactic acid. Examples of such alkoxyhydrocarbon carboxylic acids are ethoxyformic acid (ethyl hydrogen carbonate); butyloxyformic acid; pentyloxyformic acid; hexyloxyformic acid; dodecyloxyformic acid; hexadecyloxyformic acid, and the like.

Any or all of the 2-, 3-, and 4-hydroxy groups can also be etherified, for example, with alkyl, advantageously of not more than 20 carbon atoms; cycloalkyl, advantageously of from 3 to not more than 12 carbon atoms: or ylidene (e.g., 3,4-O-ylidene) group for example alkylidene, advantageously of not more than 20 carbon atoms and aramethylidene and vinylogs thereof, advantageously of not more than 12 carbon atoms. Examples of alkylidene are given above and examples of aramethylidene are furfurylidene, 5-methylfurfurylidene, benzylidene, m-tolylidene, o-tolylidene, p-tolylidene, o-chlorobenzylidene, m-chorobenzylidene, m-bromobenzylidene, p-bromobenzylidene, p-methoxybenzylidene, m-methoxybenzylidene, o-methoxybenzylidene, 3,4-dimethoxybenzylidene, salicylylidene, p-hydroxybenzylidene, 3,4,5-trimethoxybenzylidene, piperonylidene, o-nitrobenzylidene, p-chlorobenzylidene, m-nitrobenzylidene, p-nitrobenzylidene $\beta$-naphthylidene, p-bromobenzylidene, p-bromobenzylidene, 2,4-dichlorobenzylidene, 3-methoxy - 4-hydroxybenzylidene, terephthylidene, 3,4-dihydroxybenzylidene, and cinnamylidene.

The nitrogen can be protected by converting the free base to an acid addition salt or by replacing an N-hydrogen by a protective group removable by hydrogenolysis, for example, a protective hydrocarbyloxycarbonyl group which is removable by hydrogenolysis, as exemplified in the above mentioned Belgian Patent 667,948, Spanish Patent 316,092, and U.S. Patent 3,380,992, and the parent applications, or trityl (triphenylmethyl), diphenyl (p-methoxyphenyl)methyl, bis-(p - methoxyphenyl)-phenylmethyl, benzyl, or p-nitrobenzyl. The 3-0- and 4-0- groups can be protected by an alkylidene or aralkylidene group and the 7-0-position by a trityl group, which protective groups can be removed by mild acid hydrolysis or by hydrogenolysis.

The compounds of Formula I exist either in the protonated or non-protonated forms according to the pH of the environment. When the protonated form is intended, the compound is qualified as the acid addition salt; when the non-protonated form is intended, it is qualified as the free base. The free bases can be converted to stable acid-addition salts by neutralizing the free base with the appropriate acid to below about pH 7.0, and advantageously to about pH 2 to pH 6. Suitable acids for this purpose include hydrochloric, sulfuric, phosphoric, thiocyanic, fluosilicic, hexafluoroarsenic, hexafluorophosphoric, acetic, succinic, citric, lactic, maleic, fumaric, pamoic, cholic, palmitic, lauric, camphoric, glutaric, glycolic, phthalic, tartaric, mucic, stearic, salicylic, 3-phenylsalicylic, 5-phenylsalicylic, 3-methylglutaric, orthosulfobenzoic, cyclohexanesulfamic, cyclopentanepropionic, 1,2-cyclohexanedicarboxylic, 4-cyclohexanecarboxylic, octadecenylsuccinic, octenylsuccinic, methanesulfonic, benzenesulfonic, helianthic, Reinecke's, dimethyldithiocarbamic, cyclohexylsulfamic hexadecylsulfamic, octadecylsulfamic, sorbic, monochloroacetic, undecylenic, 4'-hydroxyazobenzene-4-sulfonic, octyldecylsulfuric, picric, benzoic, cinnamic, and like acids.

The acid-addition salts can be used for the same purposes as the free base or they can be employed to upgrade the same. For example, the free base can be converted to an insoluble salt, such as the picrate, which can be subjected to purification procedures, for example, solvent extractions and washings, chromatography, fractional liquid-liquid extractions, and crystallization and then used to regenerate the free base form by treatment with alkali or to make a different salt by metathesis. Or the free base can be converted to a water-soluble salt, such as the hydrochloride or sulfate and the aqueous solution of the salt extracted with various water-immiscible solvents before regenerating the free base form by treatment of the thus-extracted acid solution or converted to another salt by metathesis. The free bases of Formula I can be used as a buffer or as an antacid. The compounds of Formula I react with isocyanates to form urethanes and can be used to modify polyurethane resins. The thiocyanic acid addition salt when condensed with formaldehyde forms resinous materials useful as pickling inhibitors according to U.S. Patents 2,425,320 and 2,606,155. The free bases also make good vehicles for toxic acids. For example, the fluosilicic acid addition salts are useful as mothproofing agents according to U.S. Patents 1,915,334 and 2,075,359 and the hexafluoroarsenic acid and hexafluorophosphoric acid addition salts are useful as parasiticides according to U.S. Patents 3,122,536 and 3,122,552.

The following examples are illustrative of the process and products of the present invention but are not to be

EXAMPLE 1

*Methyl 7(S)-chloro-7-deoxy-α-thiolincosaminide*

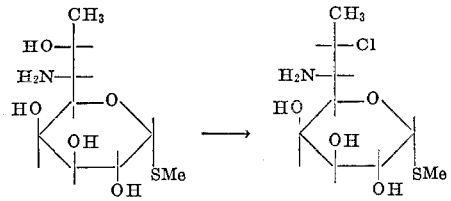

To a suspension of 197.2 g. of triphenylphosphine in 1.5 l. of anhydrous acetonitrile was added 52.5 g. of chlorine. With stirring, 18.75 g. of methyl α - thiolincosaminide (U.S. Patent 3,179,565) was added. After 2.5 hrs. at ambient temperature, 50 ml. of methanol was added. The mixture was concentrated to a thick syrup. The concentrate was diluted with methylene chloride and extracted three times with water. The aqueous extracts were washed twice with methylene chloride. The extracts were made alkaline with sodium hydroxide and extracted repeatedly with methylene chloride. The organic extract was dried and evaporated under vacuum. The residue was chromatographed over 1.1 kg. of silica gel using chloroform-methanol (4:1) for elution. The major fraction selected on the basis of its TLC (thin layer chromatography) profile weighed 4.4 g. Recrystallization from methanol-water afforded 2.73 g. of methyl 7(S)-chloro-7-deoxy-α-thiolincosaminide, M.P. 178–181°.

*Analysis.*—Calcd. for $C_9H_{18}ClNO_4S$: C, 39.77; H, 6.67; N, 5.16; S, 11.80; O, 13.05. Found: C, 39.91; H, 7.02; N, 5.57; S, 11.99; Cl, 13.33.

EXAMPLE 2

*Methyl 7(S)-chloro-7-deoxy-α-thiolincosaminide*

A mixture of 1.0 g. of methyl α-thiolincosaminide, 3.0 g. of triphenylphosphine, 10 ml. of carbon tetrachloride, and 100 ml. of acetonitrile were heated at reflux for 3 hrs. The reaction mixture was evaporated to dryness under vacuum and the residue purified by chromatography over 500 g. of silica gel using a solvent system composed of chloroform and methanol (4:1). The product fractions (as determined by TLC) were collected, combined, and evaporated to a white solid. On recrystallization from ethanol, there was obtained 250 mg. (23.3%) of crystals of methyl 7(S)-chloro-7-deoxy-α-thiolincosaminide, M.P. 169–172° C. having an I.R. identical with the product of Example 1.

EXAMPLE 3

*7(S)-chloro-7-deoxylincomycin from methyl 7(S)-chloro-7-deoxy-α-thiolincosaminide*

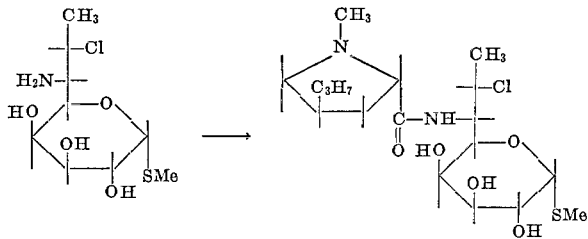

A mixture of 915 mg. of trans-4-propyl-L-hygric acid (U.S. Patent No. 3,282,956, granted Nov. 1, 1966), 1.23 ml. of triethyl amine and 600 mg. of isobutylchloroformate in 80 ml. of acetonitrile was stirred at −5° for 15 minutes. A solution of 1.09 g. of methyl 7(S)-chloro-7-deoxy-α-thiolincosaminide in 20 ml. of water and 20 ml. of acetone was added. The mixture was stirred at ambient temperature for 2 hrs. The mixture was evaporated and the residue extracted with methylene chloride. Evaporation of the solvent yielded 613 mg. of oil. This oil was chromatographed over 100 g. of silica gel using chloroform-methanol (7:1) for elution. The major fraction, 380 mg., was recognized as 7(S)-chloro-7-deoxylincomycin by TLC. It was dissolved in acetone, acidified with dilute HCl and evaporated. The residue was crystallized from absolute ethanol to give 180 mg. of 7(S)-chloro-7-deoxylincomycin, M.P. 158–160°, identical by infrared data with a known sample of 7(S)-chloro-7-deoxylincomycin.

EXAMPLE 4

*Methyl 7(S)-bromo-7-deoxy-α-thiolincosaminide*

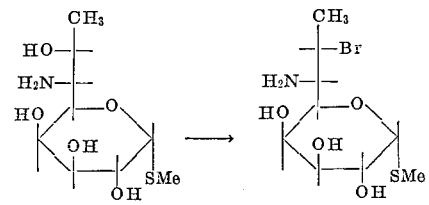

Triphenylphosphine (39.3 g.) was added to 300 ml. of acetonitrile and 40 ml. of solvent distilled. The solution was cooled to 20° and 8.1 ml. of bromine in 10 ml. of acetonitrile added dropwise, keeping the temperature below 30° by external cooling. Triphenylphosphonium dibromide partially crystallized from the reaction mixture. Methyl α-thiolincosaminide, 10 g., was added and the reaction mixture stirred at ambient temperature for 18 hrs. To the deeply colored solution, 20 ml. of methanol was added. After stirring for 10 min., the solvent was distilled in vacuo. The residue was partitioned between 50 ml. of water and 100 ml. of chloroform. The chloroform was extracted three times with dilute acid. The combined aqueous extract was made alkaline with potassium hydroxide and stirred at 10° for 1 hr. Filtration afforded a dark residue which was dissolved in 70 ml. of hot ethanol. Crystals were deposited from this solution on cooling. Recrystallization from 30 ml. of ethanol gave 150 mg. of methyl 7(S)-bromo-7-deoxy-α-thiolincosaminide, M.P. 163–166° (sinter 141°).

*Analysis.*—Calcd. for $C_9H_{18}BrNO_4S$: Br, 25.17. Found: Br, 24.58.

EXAMPLE 5

*Part A–5.—7(S)-bromo-7-deoxy-N-demethyl - N - carbobenzoxylincomycin (trans) and 7(S)-bromo-7-deoxy-N-demethyl-N-carbobenzoxyallolincomycin (cis)*

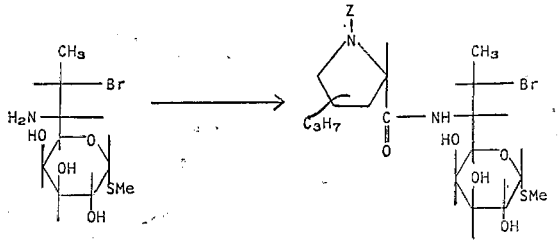

To a solution of 154 mg. of 1-carbobenzoxy-4-transand cis-propyl-L-proline in 15 ml. of acetonitrile was added 0.64 g. of triethylamine. The solution was cooled to 7° and 0.079 ml. of isobutylchloroformate was added. After stirring for 10 min., a solution of 200 mg. of methyl 7(S)-bromo-7-deoxy-α-thiolincosaminide in 8 ml. of acetone and 2 ml. of water was added. The reaction mixture was stirred for 24 hrs. The solvent was distilled in vacuo and the residue crystallized from hot acetone to give 150 mg. of a mixture of 7(S)-bromo-7-deoxy-N-demethyl-N-carbobenzoylincomycin, and 7(S)-bromo-7-deoxy-N-demethyl-N - carbobenzoxyallolincomycin, M.P. 144–146° C. dec. An additional quantity, M.P. 139–145°, was obtained by concentrating the mother liquor.

The material possessed a satisfactory infrared curve showing amide absorption at 1675 cm.$^{-1}$ and 1550 cm.$^{-1}$. It was not further purified but used directly in the next step.

Part B–5.—7(S) - bromo-7-deoxy-N-demethyllincomycin hydrochloride and 7(S)-bromo-7-deoxy-N-demethylallolincomycin hydrochloride.

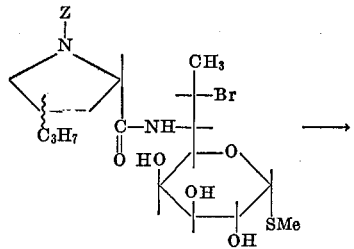

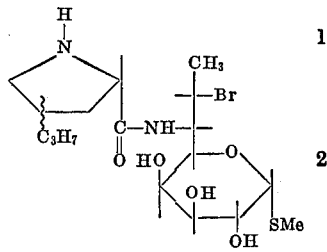

A mixture of 120 mg. of the 144–146° C. material of Part A–5 and 60 mg. of 10% palladium on charcoal in 8 ml. of methanol was shaken under 40 lbs. of hydrogen pressure for 5 hrs. The catalyst was removed by filtration and the residue evaporated to dryness. The residue was dissolved in a few ml. of acetone and acidified with dilute HCl. Crystalline 7(S)-bromo-7 - deoxy - N - demethyllincomycin and 7(S)-bromo-7 - deoxy - N - demethylallolincomycin hydrochlorides formed on refrigeration of the solution. Standard curve assay vs. *S. lutea* showed 0.5× the activity of lincomycin.

EXAMPLE 6

Following the procedure of Example 2 substituting the carbon tetrachloride by carbon tetraiodide, methyl 7(S)-iodo-7-deoxy-α-thiolincosaminide is obtained.

EXAMPLE 7

Following the procedure of Example 3 substituting the methyl 7(S)-chloro-7-deoxy-α-thiolincosaminide by methyl 7(S)-iodo-7-deoxy-α-thiolincosaminide there is obtained 7(S)-iodo-7-deoxy-lincomycin.

By substituting the methyl α-thiolincosaminide in Examples 1, 2, 4, and 6 by other alkyl or by cycloalkyl or aralkyl α-thiolincosaminides wherein alkyl is ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereof; cycloalkyl is cyclopropyl, cyclobutyl, cyclopentyl, cyclohexyl, cycloheptyl, cyclooctyl, 2-methylcyclopentyl, 2,3-dimethylcyclobutyl, 2-methylcyclobutyl, and 3-cyclopentylpropyl; and aralkyl is benzyl, phenethyl, 3-phenylpropyl, and α-naphthylmethyl (U.S. application Ser. No. 463,934, filed June 14, 1965, now U.S. Patent 3,380,992), the corresponding alkyl, cycloalkyl, and aralkyl 7(S)-halo-7-deoxy-α-thiolincosaminides are obtained. On substituting these compounds in Examples 3, 5, and 7, the corresponding 7(S)-halo-7-deoxylincomycin analogs are obtained.

By substituting the α-thiolincosaminides by the 7-epi-α-thiolincosaminide of the formula

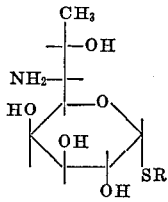

(U.S. application Ser. No. 463,934, filed June 14, 1965, now U.S. Patent 3,380,992) the corresponding 7(R)-halo-7-deoxy-7-epi-α-thiolincosaminides of the formula

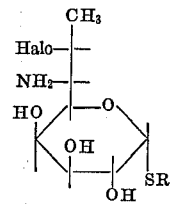

which on acylation by the procedure of Examples 3, 5, and 7 can be converted to 7(R)-halo-7-deoxy-lincomycin having the formula

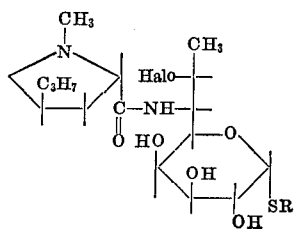

and the analogs thereof.

We claim:
1. A thiolincosaminide of the formula:

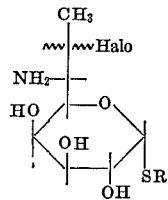

wherein R is alkyl of not more than 20 carbon atoms, cycloalkyl of from 3 to not more than 8 carbon atoms, or aralkyl of not more than 8 carbon atoms and Halo is chlorine, bromine or iodine.

2. A thiolincosaminide of claim 1 in which halo is chlorine and R is alkyl of not more than 20 carbon atoms.
3. A triolincosaminide of claim 1 in which halo is bromine and R is alkyl of not more than 20 carbon atoms.
4. A thiolincosaminide of claim 2 in which R is methyl.
5. A thiolincosaminide of claim 3 in which R is methyl.
6. A thiolincosaminide of claim 1 having the formula:

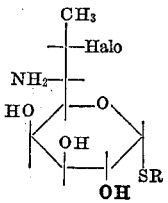

wherein R is alkyl of not more than 8 carbon atoms and halo is chlorine, bromine or iodine.

7. A thiolincosaminide of claim 6 in which halo is chlorine.
8. A thiolincosaminide of claim 7 in which R is methyl.
9. A thiolincosaminide of claim 6 in which halo is bromine.
10. A thiolincosaminide of claim 9 in which R is methyl.

11. A thiolincosaminide of claim 1 having the formula:

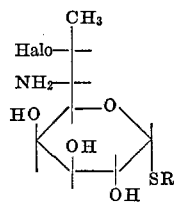

wherein R is alkyl of not more than 8 carbon atoms.

12. A thiolincosaminide of claim 11 in which halo is chlorine.

13. A thiolincosaminide of claim 12 in which R is methyl.

14. A thiolincosaminide of claim 11 in which halo is bromine.

15. A thiolincosaminide of claim 14 in which R is methyl.

References Cited

UNITED STATES PATENTS 3,418,414  12/1968  Houtman _____ 260—210

OTHER REFERENCES

Coe: "Jour. Chem. Soc.," 1954, pp. 2281–2288.

LEWIS GOTTS, Primary Examiner

J. R. BROWN, Assistant Examiner